July 31, 1956
C. H. HALE
2,757,203
SYNTHESIS OF ALCOHOL AND ALDEHYDE FROM
OLEFINS, CARBON MONOXIDE AND HYDROGEN
Original Filed March 2, 1949
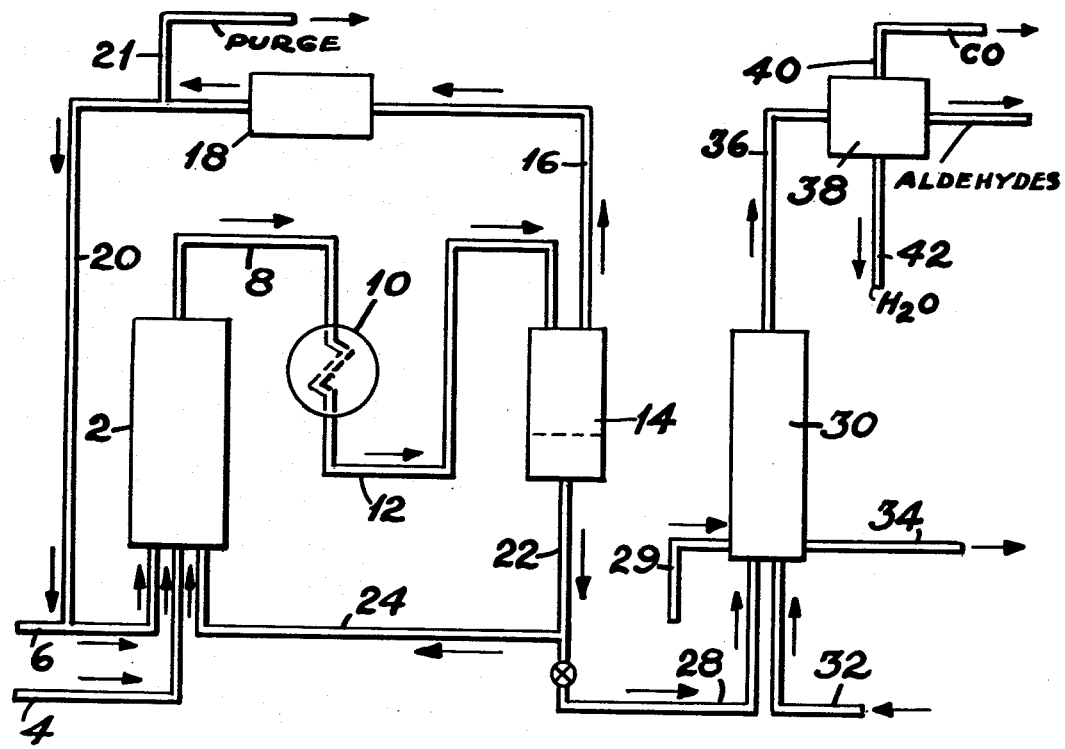
*Fig.–I*
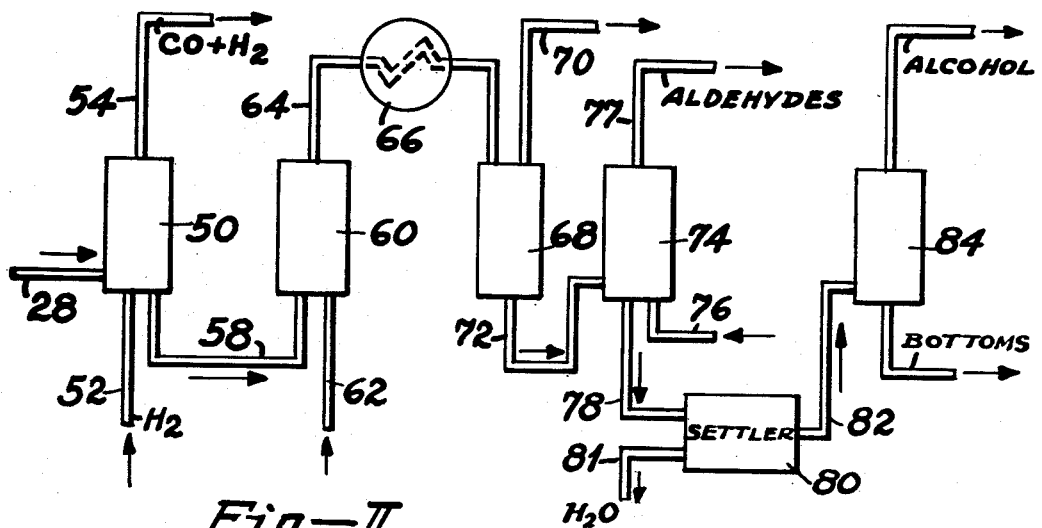
*Fig.–II*
Cecil H. Hale Inventor
By J. Cashman Attorney

2,757,203

SYNTHESIS OF ALCOHOL AND ALDEHYDE FROM OLEFINS, CARBON MONOXIDE AND HYDROGEN

Cecil H. Hale, Austin, Tex., assignor to Esso Research and Engineering Company, a corporation of Delaware Continuation of abandoned application Serial No. 79,268, March 2, 1949. This application April 15, 1955, Serial No. 501,654

5 Claims. (Cl. 260—604)

The present invention relates to the production of oxygenated organic compounds by the catalytic reaction of olefins with hydrogen and carbon monoxide. More specifically the present invention presents a process for increasing the yield of aldehydes that may be obtained at the expense of undesirable secondary reaction products resulting from this process.

It is now well known in the art that oxygenated organic compounds may be synthesized from olefins by reaction of the latter with carbon monoxide and hydrogen in the presence of catalyst containing cobalt or iron in a two-stage process. In the first stage, the olefinic material, the catalyst, and proper proportions of CO and $H_2$ are reacted to give a product which consists predominantly of aldehydes, and this material may be further hydrogenated in the second stage to give the corresponding primary alcohols. The over-all reaction consists essentially of an addition of $H_2$ and CO to the unsaturated linkage and may be formulated as follows:

Stage 1.  $RCH=CH_2 + CO + H_2 \rightarrow RCH_2-CH_2CHO$ 

Stage 2.  $RCH_2CH_2CHO + H_2 \rightarrow RCH_2CH_2CH_2OH$ 

It is thus seen that both the aldehyde and the alcohol formed as a result of the reaction contain one more carbon atom than the olefinic material from which they are derived.

The carbonylation reaction provides a particularly effective method for preparing valuable primary alcohols, which find large markets particularly as intermediates for detergents and plasticizers. The carbonylation, or "Oxo" process, as it is sometimes called, may be used effectively with long and short chain olefinic compounds, depending on the type alcohol desired. Thus straight and branch chained olefins and diolefins such as propylene, butylene, butadiene, pentene, pentadiene, hexene, heptene, olefin polymers such as di- and tri-isobutylene, hexene and heptene dimers, polypropylenes, and olefinic fractions from the hydrocarbon synthesis process, thermal or catalytic cracking operations, and other sources of hydrocarbon fractions containing such olefins may be used as starting material, depending on the nature of the final product desired. In general, olefins having up to about 18–20 carbon atoms in the molecule are preferred in this reaction.

The catalysts for the first stage of the process are usually employed in the form of salts of the catalytically active metals with high molecular weight fatty acids such as stearic, palmitic, oleic, naphthenic and similar acids. Thus, as suitable catalysts are such organic salts as cobalt stearate, oleate, or naphthenate or iron linoleate. These salts are soluble in the liquid olefin feed and may be supplied to the first reaction zone as hydrocarbon solutions or preferably, dissolved in the olefin feed.

The synthesis gas mixture fed to the first stage may consist of any ratio of $H_2$ to CO, but preferably these two gases are present at about 1.0 volume hydrogen per volume CO. The conditions for olefins reacting with $H_2$ and CO vary somewhat in accordance with the nature of the olefin feed, but the reaction is generally conducted at pressures in the range of about 1500 to 4500 p. s. i. g. and at temperatures in the range of about 150° to 450° F.

The quantity of $H_2 + CO$ with respect to olefin used may vary within wide ranges, for example, from 1000 to 45,000 cu. ft. of $H_2 + CO$ per barrel of olefin fed. In general, about 2500 to 5000 cu. ft. of $H_2 + CO$ per barrel of olefin feed are employed.

One of the serious problems that has been encountered in the carbonylation reaction has been the formation of secondary reaction products. The carbonylation reaction is a highly exothermic one, with a heat release of the same high order of magnitude as in the hydrocarbon synthesis reaction, about 35 to 50 kcal./gram mol. olefinic double bond reacted. For this reason, very careful temperature control is required in the carbonylation reaction zone to prevent, or at least to minimize secondary reaction product formation. Thus, the decomposition of the carbonylation catalyst to metallic cobalt reaches an appreciable rate above 350° F. The presence of cobalt metal catalyzes such secondary reactions as polymerization of aldehydes, aldol condensations and, of course, hydrogenation of the aldehydes to alcohols as well as hydrogenation of olefins to paraffins.

The present invention is based upon the discovery that the products of the carbonylation reaction contain significant quantities of acetals. Though it is, of course, well known that acetals are formed by the interaction of aldehydes and alcohols, a mineral acid catalyst is considered necessary to form these compounds, in accordance with the reaction:

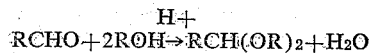
$$RCHO + 2ROH \xrightarrow{H+} RCH(OR)_2 + H_2O$$

These compounds are very stable to heat, and boil substantially above the aldehydes and alcohols from which they are formed. In the absence of an acid actalyst, however, it has previously been known that anhydrous alcohols, on the other hand, may react directly with aldehydes to form exothermic addition compounds, hemiacetals which are fairly unstable, and in the presence of heat, break down to the corresponding alcohol and aldehyde. Since the carbonylation reaction involves no step wherein mineral acids are added or formed, the presence of acetals in the process has hitherto not been suspected.

The formation of acetals in the course of the carbonylation reaction is particularly undesirable when an alcoholic solvent is employed as diluent in the reaction, particularly when the lower olefins, as ethylene or propylene, are being treated to produce the next higher aldehyde and/or alcohol. Thus when propylene is to be converted to butyraldehyde and/or butanol, butyl alcohol has been added to the olefin in order to maintain a liquid medium and to facilitate distillation of the final products. Under the reaction conditions, however, acetals result from the interaction of 2 mols of alcohol with one mol of aldehyde, thus substantially decreasing the yield of the aldehyde. Furthermore, since acetals on hydrogenation yield one mol of ether and one mol of alcohol per mol of acetal, there is a net loss of 2 mols of the desired alcohol in the reaction.

However, as indicated above, even though alcoholic solvent is not added with the olefin, the alcohols formed in the primary reaction or carbonylation stage react with aldehydes normally formed therein to form acetals and thus substantially cut down the yield of aldehydes and alcohols.

It is the principal object of the present invention to provide a process wherein the over-all yield and selectivity of aldehydes and alcohols from the carbonylation reaction is substantially increased.

It is also an object of the present invention to decrease the quantity of by-products from the carbonylation reaction, which by-products are only of secondary value.

Further objects of the invention will appear hereinafter.

In accordance with the present invention, wherein it is desired to recover the aldehydes produced in the carbonylation reaction, small amounts of water and minor quantities of mineral acids, such as $H_3PO_4$ are added to the aldehyde mixture prior to distillation and recovery of the aldehyde product. Though it has been pointed out above that the formation of acetals is catalyzed by mineral acids, this is a reversible reaction and in the presence of water at higher temperatures the reverse reaction, acetal decomposition, is favored. Thus, in accordance with the present invention by hydrolyzing the first stage carbonylation product simultaneously while distilling, the aldehydes are continuously removed as formed.

It is obvious, of course, that other secondary reaction products amenable to hydrolysis, and which may be formed in the primary reaction zone, such as esters produced by a Cannizzaro type reaction and aldols may also be hydrolyzed in accordance with the process of the invention further increasing the yield of the desired aldehyde.

The present invention and its application will best be understood from the more detailed description hereinafter, wherein reference will be made to the accompanying drawings, which are schematic representations of systems suitable for carrying out preferred embodiments of the invention.

Referring now to Figure I, which represents a process wherein it is desired to isolate and recover aldehydes, an olefinic compound having one carbon atom less than the number of carbon atoms in the desired resulting oxygenated compound is fed through feed line 4 to the bottom portion of primary reactor 2. The latter comprises a reaction vessel which may, if desired, be packed with non catalyctic material, such as ceramic rings, pumice, and the like, or contain no packing.

The olefinic feed preferably contains dissolved therein 1–3% by weight of a cobalt soap, such as cobalt naphthenate. If desired, the feed may comprise a solvent or diluent as well as the olefin and as an illustrative though not limiting example the solvent may preferably be a primary alcohol having one more carbon atom than the olefin feed. Simultaneously with the injection of feed, a gas mixture comprising $H_2$ and CO in the approximate ratio of 0.5 to 2 volumes of $H_2$ per volume of CO is supplied through line 6 to primary reactor 2, and flows concurrently through reactor 2 with the olefin feed. Reactor 2 is preferably operated at a pressure of about 2500–3500 p. s. i. g. and at a temperature of about 250°–450° F., depending upon the olefin feed and other reaction conditions. The rate of flow of synthesis gases and olefin through reactor 2 is so regulated that the desired conversion level of the olefin is obtained.

Liquid oxygenated reaction products containing catalyst in solution and unreacted synthesis gases are withdrawn overhead from an upper portion of reactor 2 and are transferred through line 8 to cooler 10 in which any conventional means of cooling is employed, and from there via line 12 to high pressure separator 14 where unreacted gases are withdrawn overhead through line 16, scrubbed in scrubber 18 of entrained liquid and cobalt carbonyl, and used in any way desired. They may be recycled to synthesis gas feed line 6 via line 20 or purged.

A stream of primary reaction product, which may contain in solution the mixtures of aldehydes and secondary reaction products referred to above, as well as relatively high concentrations of cobalt carbonyl is withdrawn from separator 14 through line 22. A portion of said withdrawn stream may be recycled if desired to reactor 2 via line 24 to aid in the cooling and maintenance of temperature control of the carbonylation stage. The balance of the primary reaction product, which may comprise unreacted olefins, secondary reaction products as acetals and aldols, and dissolved catalyst as well as desired aldehydes, is passed through line 28 to still 30. Also charged to still 30 through line 29 is a solution of a mineral acid, preferably phosphoric. The concentration of acid based on the total material in the still may vary from 0.1 to 10%, depending upon the amount of hydrolizable material in still 30. In general, a 1% acid concentration is preferred. Also charged to still 30 is live steam, admitted through line 32. Steam may be injected into still 30 at a pressure of from about 10 to about 250 p. s. i. g., preferably in the range of about 75 to 150 p. s. i. g., and heated to a temperature in the range of about 212 to 400° F., depending upon the nature and vapor pressures of the olefins fed to 2 and aldehydes formed therein. The variables of steam pressure, temperature, and duration of distillation may be adjusted to effect the desired hydrolysis of acetals and separation of aldehydes from the bulk of higher boiling material, such as alcohols. Also as a result of the hydrolysis and steam distillation, the bulk of the cobalt carbonyl is decomposed to the metal and CO. The alcohol and other higher boiling liquid materials, and decomposed catalyst may be withdrawn through line 34 and treated in any desired manner. It may, for example, be filtered and distilled to recover alcohols which may have been employed as diluent for the feed or which may have formed in the reactor. Also, the hydrolizing acid solution may be recovered and recycled to still 30.

Overhead from distillation zone 30 are withdrawn through line 36 steam-volatile material comprising essentially product aldehydes and low-boiling hydrocarbons, with minor admixture, higher boiling material, and, of course, water. The mixture is passed to separator 38 where gaseous material such as CO may be removed overhead through line 40, and water separated out and removed through line 42. The upper layer, comprising substantially aldehydes, may, if desired, be fractionated at atmospheric or subatmospheric pressures or be further processed in any manner desired, as hydrogenated to the corresponding alcohol or oxidized to the acid, all in a manner known per se.

Figure II represents in diagrammatic form an embodiment of the invention where it is not desired to isolate and recover aldehydes as such, but to convert them immediately to the corresponding alcohols. In this case the primary reaction product containing in solution also quantities of dissolved cobalt carbonyl is passed through line 28 to catalyst removal zone 50 wherein by suitable heat treatment at about 300°–400° F. the dissolved catalyst is decomposed to the metal. A stream of hydrogen-comprising gas may be admitted to zone 50 through line 52 to aid in stripping and removing the evolved CO resulting from the decomposition of the metal carbonyl. Pressures in zone 50 may be in the range of 15–200 p. s. i. g. and higher. The gas stream comprising $H_2$ and CO may be removed from zone 50 through line 54 and used in any manner desired.

The liquid carbonylation reaction product now substantially free of dissolved catalyst is withdrawn from zone 50 through line 58, filtered if desired, and passed to the lower portion of hydrogenator 60. Simultaneously, hydrogen is supplied to reactor 60 through line 62 in proportions sufficient to convert organic carbonyl compounds in the oxygenated feed to the corresponding alcohols. Hydrogenator 60 may contain a mass of any conventional hydrogenation catalyst, such as nickel, copper chromite, sulfactive catalysts as sulfides of molybdenum and tungsten and the like, either as such or supported on a carrier. Depending upon the catalyst, reactor 60 may be operated at pressures from 2500–4500 p. s. i. g. and at temperatures from about 300°–500° F.

The products of the hydrogenation reaction, comprising mainly alcohols but also containing significant quantities of acetals and other secondary reaction products may then be withdrawn overhead through line 64, passed through cooler 66 and thence to high pressure separator 68, where unreacted hydrogen may be withdrawn overhead through line 70 for further use in the system, if desired. Liquid products are withdrawn from separator 68 through line 72 and passed to still 74. Water or steam and phosphoric acid are introduced into still 74 through line 76, the concentration of the $H_3PO_4$ being of the same order of magnitude as described previously. As a result of the hydrolytic and mass action effect of the steam and acid, acetals are converted to aldehydes and alcohols, and the aldehydes are taken overhead through line 77 as rapidly as they are formed, along with lower boiling hydrocarbon materials.

The bottoms from this primary distillation may be passed through line 78 to a settling tank 80 wherein the water layer containing $H_3PO_4$ may be removed downwardly through line 81 and, if desired, be recycled to still 74, or be discarded. The upper layer comprising the alcohol fraction now fortified by the additional alcohol recovered by the acetal hydrolysis, may be sent through line 82 to alcohol still 84 where the product alcohols, boiling in the desired range may be removed overhead by distillation at atmospheric or reduced pressures, depending upon their molecular weight. The bottoms from this distillation may be further processed, or, if desired, may be used as fuel.

The system illustrated in the drawing and in the foregoing description permits of various modifications obvious to those skilled in the art. Thus the aldehydes withdrawn overhead from still 74 may, if desired, be recycled to hydrogenator 60 for further conversion to alcohols. Other acids besides $H_3PO_4$ may be employed provided they have no deleterious effect upon the reaction products. Among such acids are sulfuric and benzene sulfonic. It may be desirable to reflux for a relatively brief period the hydrolysis mixture to insure substantially complete reaction. It may also be desirable to maintain means of agitation in the stills to insure intimate contact of the hydrolyzing agent with the organic material. If a diluent alcohol is added with the feed this may be recovered in the final distillation process and be recycled to the fresh feed.

The foregoing description although illustrating preferred embodiments of the invention is not intended to exclude other modifications obvious to those skilled in the art, and which are within the scope of the invention.

This application is a continuation of Serial No. 79,268, filed March 2, 1949, of the same inventor and now abandoned.

What is claimed is:

1. An improved process for obtaining high yields of aldehydes which comprises charging a mixture of CO and $H_2$ to a carbonylation reaction zone, simultaneously charging an olefinic hydrocarbon containing a cobalt catalyst dissolved therein to said reaction zone, permitting the reactants to remain resident in said reaction zone at elevated temperatures and pressures for a sufficient period of time to form reaction products comprising major proportions of aldehydes containing one more carbon atom than said olefin, withdrawing said reaction products and catalyst from said reaction zone, charging said mixture to a steam distillation-hydrolysis zone, maintaining a pressure about 15 to 250 p. s. i. g. in said steam distillation-hydrolysis zone and a temperature of about 212°–400° F. in said steam distillation-hydrolysis zone, adding a dilute solution of a mineral acid selected from the class of $H_3PO_4$ and $H_2SO_4$ to said steam distillation-hydrolysis zone, simultaneously hydrolyzing acetals and steam distilling said mixture, decomposing cobalt carbonyl in said steam distillation-hydrolysis zone and withdrawing overhead substantial quantities of aldehyde product substantially completely free of cobalt from said steam distillation-hydrolysis zone.

2. The process of claim 1 wherein the concentration of said mineral acid in the products in said steam distillation-hydrolysis zone is from 1% to 10% of said products.

3. An improved carbonylation process which comprises passing olefinic compounds, carbon monoxide, hydrogen and a saturated primary alcohol diluent into a carbonylation zone, contacting said reactants with a cobalt carbonylation catalyst at elevated temperatures and pressures to produce oxygenated reaction products containing one more carbon atom per molecule than said olefinic compounds, further subjecting a solution comprising said oxygenated compounds to a hydrogenation reaction in a hydrogenation zone, withdrawing from said hydrogenation zone an alcohol product containing acetals, passing said product to a distillation zone, introducing into said distillation zone a hydrolyzing solution of acid in water, subjecting said acetals in said distillation zone to an acidic hydrolysis reaction concurrent with distillation of aldehydes formed by said reaction and recovering high yields of alcohol product from bottoms of said distillation by separation of an acid water layer therein.

4. In a carbonylation process wherein the olefinic hydrocarbon, carbon monoxide, and hydrogen are contacted with a cobalt carbonylation catalyst at elevated temperatures and pressures to produce oxygenated organic products including aldehydes having 1 more carbon atom per molecule than the olefinic hydrocarbon in a primary reaction zone and acetals, the improvement which comprises withdrawing the oxygenated organic product containing the catalyst in solution from said reaction zone to a steam distillation zone, adding a sufficient quantity of a dilute water solution of acid to said steam distillation zone to effect acid hydrolysis of acetals and decomposition of the cobalt catalyst in said organic product concomitantly with steam distillation of aldehydes from higher boiling material of said product containing decomposed cobalt catalyst and hydrolyzing said solution.

5. In a carbonylation process wherein an olefinic hydrocarbon, carbon monoxide and hydrogen are contacted with a cobalt carbonylation catalyst in a carbonylation zone under conditions to produce oxygenated organic reaction products including aldehydes having 1 more carbon atom per molecule than said olefinic hydrocarbon and acetals, and wherein said aldehydes are steam distilled from said products then are further subjected to a hydrogenation reaction in a hydrogenation zone to form oxygenated organic products including alcohols, the improvement which comprises subjecting the reaction products from at least one of said zones to steam distillation with an added amount of water and acid to cause hydrolysis which converts acetal components of said products into aldehydes and alcohols, and taking the resulting aldehydes overhead as they are formed as steam distillate leaving as bottoms hydrolyzing acid solution and higher boiling liquid materials including alcohols.

References Cited in the file of this patent

UNITED STATES PATENTS

| | | |
|---|---|---|
| 2,437,600 | Gresham | Mar. 9, 1948 |
| 2,595,096 | Parker | Apr. 29, 1952 |
| 2,686,206 | Cerveny | Aug. 10, 1954 |